United States Patent [19]

Itabashi

[11] Patent Number: 5,003,329
[45] Date of Patent: Mar. 26, 1991

[54] CAMERA EMPLOYING A DATA IMPRINTING DEVICE

[75] Inventor: Tomoaki Itabashi, Shiki, Japan

[73] Assignee: Asahi Kogaku Kogyo Kabushiki Kaisha, Tokyo, Japan

[21] Appl. No.: 480,596

[22] Filed: Feb. 15, 1990

[30] Foreign Application Priority Data

Feb. 16, 1989 [JP] Japan ................... 1-17002[U]

[51] Int. Cl.⁵ .................. G03B 17/24; G03B 17/20
[52] U.S. Cl. ................................ 354/106; 354/289.12
[58] Field of Search ............... 354/106, 105, 289.12, 354/471, 465, 107, 108

[56] References Cited

U.S. PATENT DOCUMENTS

| | | | |
|---|---|---|---|
| 4,183,645 | 1/1980 | Ohmura et al. | 354/106 |
| 4,453,814 | 6/1984 | Satoh et al. | 354/107 |
| 4,801,793 | 1/1989 | Vaynshteyn | 354/106 |

FOREIGN PATENT DOCUMENTS

| | | |
|---|---|---|
| 0054762 | 6/1982 | European Pat. Off. |
| 263351 | 4/1988 | European Pat. Off. |
| 1205108 | 1/1986 | U.S.S.R. |
| 1564712 | 4/1980 | United Kingdom |
| 1589683 | 5/1981 | United Kingdom |
| 2224127 | 4/1990 | United Kingdom |

Primary Examiner—Brian W. Brown
Assistant Examiner—Cassandra C. Spyrou
Attorney, Agent, or Firm—Sandler, Greenblum & Bernstein

[57] ABSTRACT

In a camera, a data imprinting device for putting additional data on a film plane together with optical image data obtained through a photographic lens is provided between the film plane and a back cover of the camera. A data back, which comprising a back cover of a camera and a data imprinting device attached thereto, comprises light emitting device such as LED arranged to be movable in parallel with the film plane emitting light to imprint the additoinal data on the film plane. A guide plate is provided for locating the light emitting device at a desired position in a predetermined area and a pressure plate is provided for holding the film plate at a predetermined position, the pressure plate being formed such that at least the portion thereof corresponding to the movement range of said light emitting device is transparent.

14 Claims, 3 Drawing Sheets

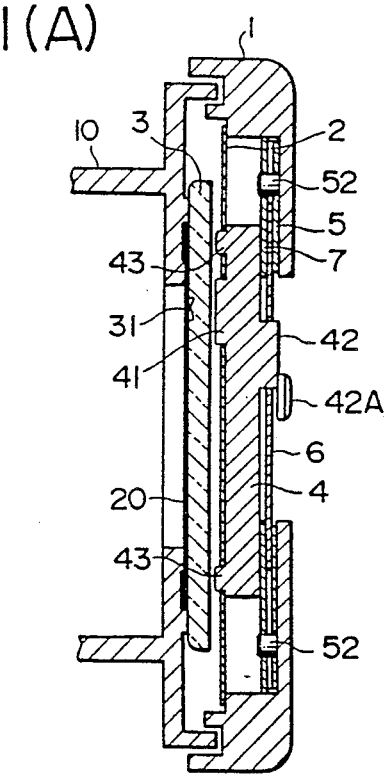
FIG. I(A)
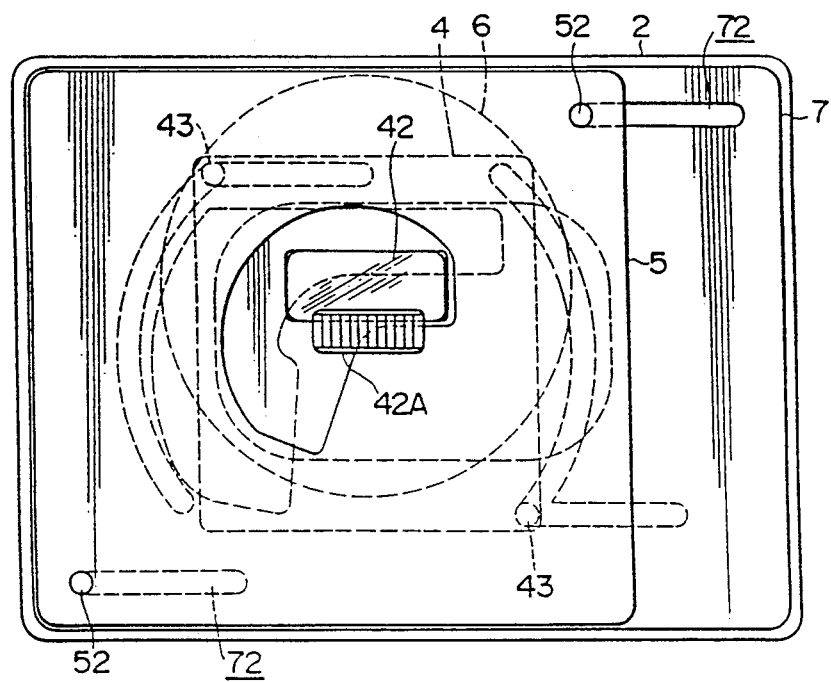
FIG. I(B)

CAMERA EMPLOYING A DATA IMPRINTING DEVICE

BACKGROUND OF THE INVENTION

The present invention relates to a camera employing data imprinting device with which a data is put on the film plane in addition to the optical image obtained through a photographic lens.

A data conventional imprinting device is known which imprints data such as a date, a shutter speed, an f-number or the like on a film when a picture is taken.

The data imprinting device generally comprises a data module having a data imprinting function that is fixedly interposed between a back cover and a pressure plate.

The data module is provided with an imprinting light emitting unit by which data to be imprinted is caused to emit light from an LED (Light Emitting Diode) or the like to expose a photosensitive material on a film to the light. A data display unit is provided indicating the data to be imprinted to the camera user. These units are disposed on the opposite sides (front and rear sides) of the data module in such a manner that the imprinting light emitting unit confronts the film plane through an opening formed in the pressure plate and the data display unit can be visually recognized through an opening formed in the back cover.

In the data imprinting device described above, however, since the data module is fixed between the back cover and the pressure plate, the position where the data is imprinted on the film plane is limited to a fixed position in a fixed direction on the film plane. More specifically, the data is imprinted at the fixed position in the fixed direction regardless of whether the picture is taken horizontally or vertically. As a result, a problem arises in that when a camera is held to take a picture in a direction different from that in which data is displayed (i.e., the data is imprinted horizontally on the film plane, which is a usual case whereas the camera is vertically held), it is difficult to read the data. Further, a problem also arises in that when the data is imprinted at a bright portion of a picture or a portion having the same color as that of the imprinted data due to the composition and background of the picture, the data is difficult to read. This is also caused by the data imprinting position being fixed.

To solve these problems, it is possible to use a method of providing a plurality of data modules or a method of providing a data module having a plurality of imprinting light emitting units. These methods, however, increase the cost of camera and further cause a problem in that the surface positioning accuracy of a pressure plate is very difficult to maintain because the opening area thereof is increased.

SUMMARY OF THE INVENTION

It is therefore an object of the invention to provide a data imprinting device in which the position and direction of imprinted data can be changed in accordance with whether a camera is held horizontally or vertically when a picture is taken or depending upon the composition of the picture.

In order to accomplish the object, according to the invention, there is provided a camera employing a data imprinting device for putting data on a film plane together with an optical image obtained through a photographic lens, the data imprinting device being provided between the film and a back cover of the camera. The camera comprises;

a light emitting device emitting means movably arranged for emitting light to imprint the data on the film plane and;

a guide mechanism for locating the light emitting device at a desired position in a predetermined area. Further, a pressure plate for holding the film plane at a predetermined is provided and the pressure plate is formed such that at least the portion thereof corresponding to the predetermined area is transparent.

DESCRIPTION OF THE ACCOMPANYING DRAWINGS

FIG. 1 (A) is a cross sectional view of a data imprinting device of a camera embodying the present invention;

FIG. 1 (B) is a rear view of a data imprinting device of the camera when a back cover is removed;

FIGS. 2 (A) through 2 (D) are plan views of components of the camera utilizing the data imprinting device embodying the invention; and FIG. 3 is a diagram indicating the locus along which a data emitting unit of the data back is moved.

DESCRIPTION OF THE PREFERRED EMBODIMENTS

Figure 2A:
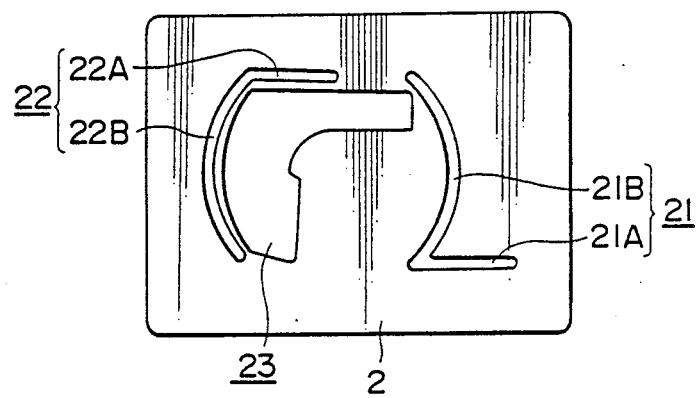
Figure 2B:
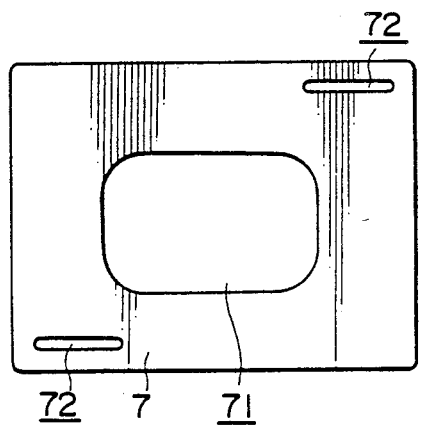
Figure 2C:
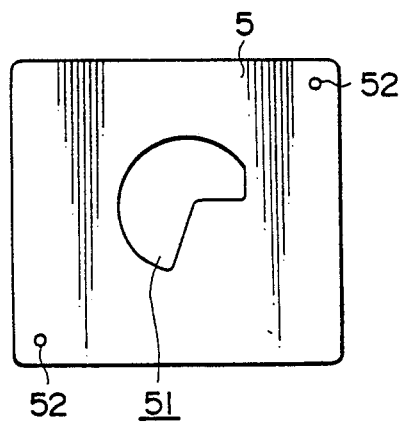
Figure 2D:
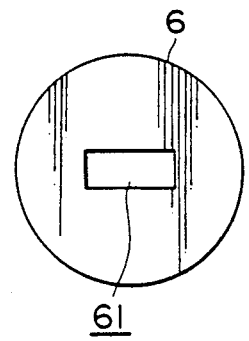

FIG. 1 (A) is a cross sectional view of a data back, which comprises a back cover installed with a data imprinting device thereon, embodying the present invention, and FIG. 1 (B) is a rear view thereof, when a back cover 1 is removed.

The back cover 1 is swingably attached to a camera main body 10 at one end thereof, not shown, and thus the back cover can be swingably opened and closed. Further, the back cover 1 installed with a data imprinting device, i.e. a data back, can be detachably and exchangeably attached to a camera main body 10. A display window 11 (FIG. 3) of a predetermined configuration is formed in the back cover 1 which corresponds to a data display unit 42 of a data imprinting device 4.

A light shield plate 7, a cam plate 2, and a pressure plate 3 are fixed inside (camera main body 10 side) the back cover 1 in this order, parallel to the back cover 1. Light shield plates 5 and 6 are interposed between the inner surface of the back cover 1 and the light shield plate 7, and the data imprinting device 4 is interposed between the light shield plate 7 and the cam plate 2. Note that the light shield plates 7, 5, and 6 are overlapped to shield light incident on a film plane 20 through the display window 11 of the back cover 1 regardless of the location of the data imprinting device 4.

The pressure plate 3 is composed of a transparent resin such as polycarbonate or the like having a predetermined thickness and a surface (the camera main body 10 side surface) finished to a predetermined surface accuracy. The pressure plate 3 is movably attached to the back cover 1 by a predetermined pressing force of a pressing urging member, not shown, and thus the pressure plate 3 presses the film 20 against the camera main body 10 while maintaining the surface thereof planar and holding the film 20 at a predetermined position. Note that since the pressure plate 3 is made of a transparent material, data-carrying light from a light emitting unit 41 of the data imprinting device 4 reaches the film plane 20 after passing through the pressure plate 3, and accordingly a hole for imprinting is not required to be formed in the pressure plate 3, whereby the pressure plate 3 can easily be made to have the predetermined surface accuracy.

As shown in a plan view of FIG. 2 (A), the cam plate 2 is a flat rectangular thin plate having two cam grooves 21 and 22, and an imprinting hole 23 formed at the center thereof for allowing the light emitting unit 41 of the data imprinting device 4 to confront the camera main body 10 (the film plane 20 side).

The cam holes 21 and 22 comprise confronting arc-shaped guide portions 21B and 22B formed about the center of the cam plate 2, and horizontal guide portions 21A and 22A. The horizontal guide portions 21A and 22A are horizontally extended in one direction (to the right in FIG. 2 (A)) from the ends of the arc-shaped guide portions 21B and 22B that diagonally confront each other across the center of the arc of the arc-shaped guide portions 21B and 22B. Note that each of the arc-shaped guide portions 21B and 22B is formed to have an central angle of 90°.

The data imprinting device 4 is a substantially square-shaped flat plate having a predetermined thickness. The light emitting unit 41 is projectedly provided at a predetermined position on the one side of the data imprinting device 4 and the data display unit 42 is projectedly provided at a predetermined position on the other side thereof. Cam projections 43 and 43 are slidably engaged with the cam holes 21 and 22 of the cam plate 2 provided at two corners of the light emitting unit 41 which diagonally confront each other. Further, an operation knob 42A is projectedly fixed to the data display unit 42.

The cam projections 43 and 43 of the data imprinting device 4 are engaged with the cam holes 21 and 22 of the cam plate 2 to be guided along the cam holes 21 and 22, whereby the data imprinting device 4 is movably held between the light shield plate 7 and the cam plate 2. Thus, the imprinting light emitting unit 41 confronts the rear surface of the pressure plate 3, and the data display unit 42 can be visually recognized from the outside through an opening 71 in the light shield plate 7, a display opening 51 in the light shield plate 5, a data display unit engaging hole 61 of the light shield plate 6, and the display window 11 of the back cover 1. Further, the data imprinting device 4, which is guided along the cam holes 21 and 22, can be horizontally moved a predetermined distance by being guided along the horizontal guide portions 21A and 22A and turned 90° by being guided along the arc-shaped guide portions 21B and 22B.

As shown in a plan view of FIG. 2 (B), the light shield plate 7 is a flat rectangular thin plate having a rectangular opening 71 formed at the center thereof and horizontal guide grooves 72 and 72 having a predetermined length formed at two corners diagonally confronting each other across the center of the light shield plate 7.

As shown in a plan view of FIG. 2 (C), the light shield plate 5 is a substantially square-shaped thin plate having the display opening 51 of a predetermined configuration formed at the center thereof in such a manner that the data display unit 42 of the data imprinting device 4 can be observed from the outside (from the rear surface), and also having guide pins 52 and 52 projected from the camera main body 10 at two corners diagonally confronting each other across the center thereof. The guide pins 52 and 52 are slidably engaged with the guide grooves 72 and 72 of the light shield plate 7, respectively.

As shown in a plan view of FIG. 2 (D), the light shield plate 6 is a flat disc-shaped thin plate having a predetermined diameter provided with the data display unit engaging hole 61 formed at the center thereof and which is engaged with data display unit 42 of the data imprinting device 4.

Since the guide pins 52 and 52 of the light shield plate 5 are engaged with the guide grooves 72 and 72 of the light shield plate 7, the light shield plate 5 is movably held between the light shield plate 7 and the back cover 1 and is movable along the guide grooves 72 and 72. Further, the light shield plate 6 is interposed between the light shield plates 5 and 7 and fixed to the data imprinting device 4 in such a manner that the data display unit 42 of the data imprinting device 4 projecting to the outside (to the rear surface) through the opening 71 of the light shield plate 7 is engaged with the data display unit engaging hole 61 thereof.

Note that the amount of movement of the light shield plate 5 guided along the guide grooves 72 and 72 of the light shield plate 7 corresponds to the amount of horizontal movement of the data imprinting device 4 guided along the horizontal guide portions 21A and 22A of the cam plate 2, and the light shield plate 5 is moved in accordance with the association of pins 53 and 53 and the horizontal movement of the data imprinting device 4. More particularly, pins 53 and 53 are provided on the light shield plate 5, extending toward the other light shield plate 6, so that two pins 53 and 53 are placed on the horizontal line crossing the center of the light shield plate 6 and contact the respective opposed portions of the peripheral surface of the light shield plate 6 as illustrated by dotted lines in FIGS. 1(B) and 2(C). In this case, when the data imprinting device 4 is moved rightward in FIG. 1(B), the right pin 53 is pressed rightward and accordingly the light shield plate 5 is moved rightward. On the other hand, when the data imprinting device 4 is moved leftward in FIG. 1(B), the left pin 53 is pressed leftward and accordingly the light shield plate 5 is moved leftward.

Further, the display opening 51 of the light shield plate 5 has a configuration of minimum possible size so that it does not prevent the data display unit 42 from turning when the data imprinting device 4 is guided to turn along the arc-shaped guide portions 21B and 22B of the cam plate 2. Thus, in the data imprinting device arranged as described above, the data imprinting device 4 is moved by operating the operation knob 42A and data can be imprinted at the desired position on a film within a range in which the data imprinting device 4 can be moved.

Figure 3:
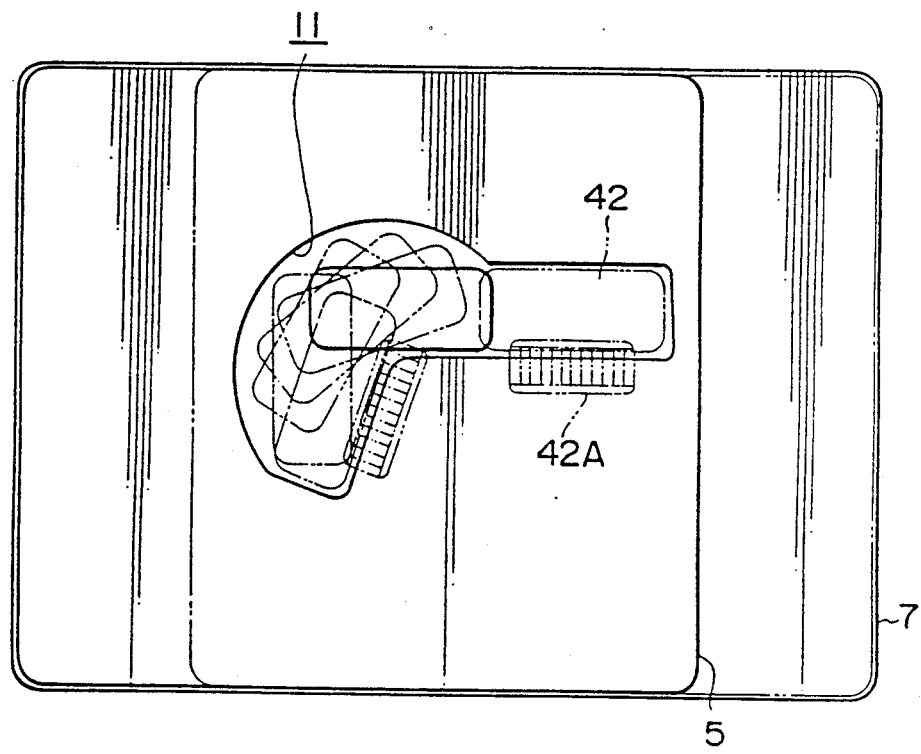

More specifically, as shown by the locus in FIG. 3 along which the data display unit 42 of the data imprinting device 4 is moved (naturally, the imprinting light emitting unit 42 is also moved along the same locus), the data imprinting device 4 can be horizontally moved to change the data imprinting position on the film plane 20 and turned at one end of the horizontal movement thereof to change the direction of the data to be imprinted by 90°. Therefore, data can be imprinted in accordance with the direction of the camera when a picture is taken by turning the data imprinting device 4 in accordance with the direction of the camera. Note that the display window 11 formed in the back cover 1 has a configuration of minimum size such that it does not prevent the movement of the data display unit 42, and thus light incident through the display opening 51 of the light shield plate 5 and the opening 71 of the light shield plate 7 on the film plane 20 is completely prevented from reaching the film plane by the combination of the light shield plates 5, 6, and 7, as described above.

Further, in the above embodiment, a part within the horizontal range of the pressure plate 3 through which data light passes at a predetermined position is formed as a convex lens 31 of a predetermined configuration, whereby, when the data imprinting device 4 is moved such that the imprinting light emitting unit 41 confronts the lens 31, the data-carrying light through the lens 31 forms a magnified image of the data on the film plane 20. This arrangement can thus change not only the position and direction at and in which the data is imprinted, but also the size of the data to be imprinted on the film plane 29.

Note that, although the pressure plate 3 is composed of the transparent material as a whole in the above embodiment only the portion thereof corresponding to the range where the imprinting light emitting unit 41 is moved may be formed of a transparent material. In addition, the configuration and arrangement of the light shield plates is not limited to the above embodiment, but may be suitably changed.

According to the data imprinting device for the camera of the invention, since a position where data is imprinted on a film plane can be changed in accordance with the direction in which a camera is held when a picture is taken, or in accordance with the composition of the picture, this solves the problem that the data is difficult to read because the data is superimposed on an object of the picture or the data is imprinted in a direction different from that of the object.

What is claimed is:

1. A camera employing a data imprinting device for putting data on a film plane together with an optical image obtained through a photographic lens, said data imprinting device being provided between said film plane and a back cover of said camera, said camera comprises;
   light emitting means movably arranged for emitting light to imprint said data on said film plane;
   guide means for locating said light emitting means at a desired position in a predetermined area; and
   a pressure plate for holding said film plane at a predetermined position, said pressure plate being formed such that at least the portion thereof corresponding to the movement range of said light emitting means is transparent.

2. The camera according to claim 1, wherein said guide means comprises:
   a cam plate having cam holes of a predetermined configuration and an opening for allowing said light omitting means to confront said film plane; and
   a plate member having cam projections capable of being slidably engaged with said cam holes of said cam plate, said light emitting means being mounted on said plate member, wherein said plate member can be slidably moved in accordance with said cam holes.

3. The camera according to claim 2, wherein said predetermined configuration is such that there are two cam holes diagonally confronting each other, each of which has a horizontally extending portion of a certain length, and an arc portion extending from one end of said horizontally extending portion and having a central angle of 90 degrees, said arc portions of said two cam holes being co-centrically formed.

4. The camera according to claim 3, wherein said guide means comprises an operation knob for manually driving said plate member.

5. The camera according to claim 1, which further comprises a display means for displaying said data.

6. The camera according to claim 5, wherein said display means is moved in response to the movement of said light emitting means, and wherein said back cover has a display window through which said display means is visible.

7. The camera according to claim 6, which further comprises light shielding means for shielding light incident upon said film plane through said display window.

8. The camera according to claim 7, wherein said light shielding means comprises a plurality of light shielding plate members overlapping to shield light incident upon said film plane through said display window.

9. The camera according to claim 8, wherein said light shielding plate members comprise:
   a first plate member having an opening in which said display means freely moves and having cam openings;
   a second plate member having cam protrusions engaged with said cam openings of said first plate member, and having a window for permitting said display means to move in said predetermined area; and
   a third plate member having a window to which said display means is fitted, and
   wherein said third plate member is moved in association with said display means and said second plate member is slid in the direction of said cam openings of said first plate member, in response to the movement of said display means.

10. The camera according to claim 1, wherein said pressure plate comprises a lens portion having a predetermined magnifying power in said predetermined area through which the light emitted from said light emitting means can pass.

11. The camera according to claim 1, wherein said predetermined area comprises a first area substantially horizontally extending and an arc-shaped second area extending from one end of said first area until the central angle of the arc of said second area is about 90 degrees.

12. The camera according to claim 1, wherein said light emitting means is arranged to be moveable parallel to said film plane.

13. A data imprinting device for use in a camera for putting data on a film plane together with an optical image obtained through a photographic lens, said device comprising:
   light emitting means movably arranged for emitting light through a pressure plate to imprint said data on said film plane;
   a pressure plate formed such that at least the portion thereof corresponding to the movement range of said light emitting means is transparent; and
   guide means for locating said light emitting means at a desired position in a predetermined area.

14. A data back employed in a camera for putting data on a film plane together with an optical image obtained through a photographic lens, said data back comprises:
   a back cover of said camera;

light emitting means movable arranged for emitting light to imprint said data on the film plane;

guide means for locating said light emitting means at a desired position in a predetermined area, said guide means being attached to said back cover; and a pressure plate for holding the film plane at a predetermined position, said pressure plate being formed such that at least the portion corresponding to the movement range of said light emitting means is transparent.

* * * * *

UNITED STATES PATENT AND TRADEMARK OFFICE
CERTIFICATE OF CORRECTION

PATENT NO. : 5,003,329
DATED : March 26, 1991
INVENTOR(S) : Tomoaki ITABASHI

It is certified that error appears in the above-indentified patent and that said Letters Patent is hereby corrected as shown below:

On the cover page, section [57], lines 1 and 2 under Abstract, change "additoinal" to ---additional---.
At column 5, line 55 (claim 2, line 5), change "omitting" to ---emitting---.
At column 6, line 68 (claim 14, line 5), change "said" to ---the---.

Signed and Sealed this

Fourteenth Day of February, 1995

Attest:

BRUCE LEHMAN

Attesting Officer     Commissioner of Patents and Trademarks